B. L. BUSCH.
LIGHTING SYSTEM FOR AUTOMOBILES.
APPLICATION FILED MAR. 15, 1917.
1,253,142.
Patented Jan. 8, 1918.
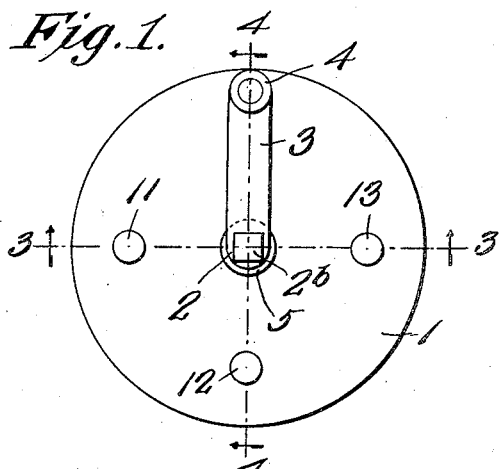
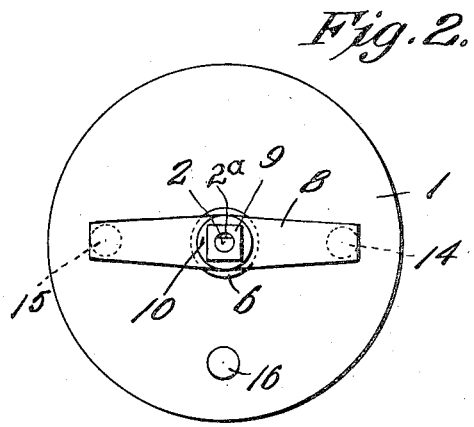
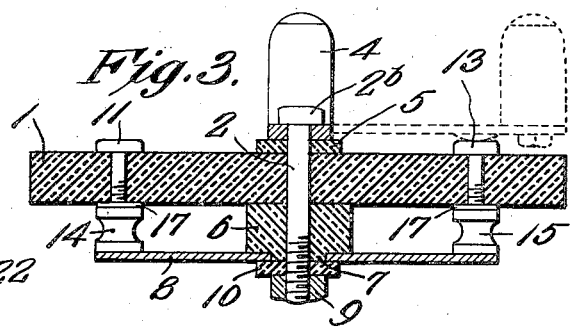
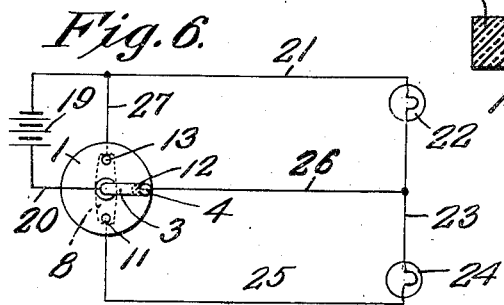
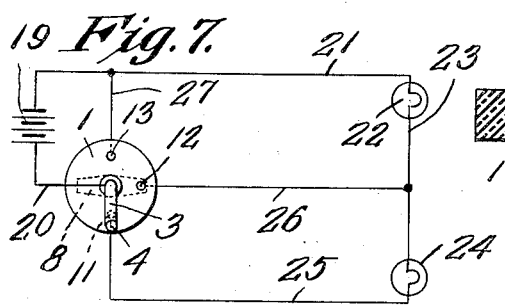
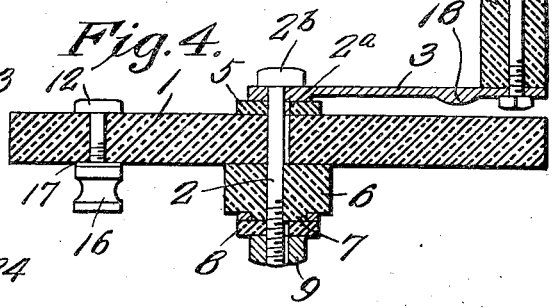
WITNESSES
James F. Crown,
H. H. Babcock.
INVENTOR
Barney L. Busch
BY Richard B. Owen,
ATTORNEY

UNITED STATES PATENT OFFICE.

BARNEY L. BUSCH, OF CHICAGO, ILLINOIS.

LIGHTING SYSTEM FOR AUTOMOBILES.

1,253,142.

Specification of Letters Patent.

Patented Jan. 8, 1918.

Application filed March 15, 1917. Serial No. 155,027.

*To all whom it may concern:*

Be it known that I, BARNEY L. BUSCH, a citizen of the United States, residing at Chicago, in the county of Cook and State of Illinois, have invented certain new and useful Improvements in Lighting Systems for Automobiles, of which the following is a specification.

This invention relates to lighting systems for automobiles, and more particularly to a system whereby the head lights of an automobile may be connected either in series or in multiple, so as to dim the lights or turn them on with full force, as desired, and a specially constructed switch for use in connection with this system.

One of the main objects of the invention is to provide a system or control for the head lights of an automobile whereby the lights may be connected to the battery either in series, so as to increase the resistance of the circuit and thus dim the lights or in multiple so as to permit the full current to flow through both lamps thus turning the lights on full force. A further object is to provide a switch for controlling this system so constructed as to permit the head lights of the automobile to be quickly and easily connected to the battery either in series or in multiple, thus eliminating all necessity for resistance coils such as are provided in the more common forms of light control systems now in use. A further object is to provide a switch of the character stated of simple construction and operation and which may be produced at relatively small cost. Further objects will appear from the detail description.

In the drawings:—

Figure 1 is a top plan view of a control switch constructed in accordance with my invention, Fig. 2 is an underneath view of the same, Fig. 3 is a section on line 3—3 of Fig. 1, Fig. 4 is a section on line 4—4 of Fig. 1, Fig. 5 is a detail of the insulating washer which supports the connecting bar, Fig. 6 is a diagrammatic view of a light control system arranged in accordance with my invention with the control switch in position for connecting the head lights in multiple, and Fig. 7 is a similar view with the head lights connected in series.

For controlling the light system I provide a switch of special construction, which is shown in Figs. 1 to 5 of the drawings. In constructing this switch I provide a disk 1 of insulating material which is centrally apertured to rotatably receive a pivot bolt 2. This bolt is flattened on one side, as at $2^a$. The pivot bolt 2 is inserted through a switch handle 3 at the inner end thereof, this handle being provided with an aperture which corresponds in shape to the cross section of the bolt thus connecting the bolt to the handle so as to turn therewith. This handle may be made of resilient sheet metal or brass, or any other suitable electric conducting material, and is provided at its outer end with a finger knob 4. A suitable washer 5 of insulating material is interposed between the switch handle and disk 1 so as to prevent wear of the disk. At the underside of the disk a heavy washer 6 is mounted about the bolt 2 and is provided with a central bore corresponding in cross section to the cross section of the bolt so that this washer is rotated with the bolt. Washer 6 is provided, at the center of its outer face, with an integral raised portion of polygonal shape in cross section which provides in effect a nut 7. A resilient connecting bar 8 is mounted about this nut, being provided at its center with an opening which snugly receives the nut. By this means the connecting bar or arm 8 is connected to the bolt 2 so as to be rotated when the bolt is rotated, but is effectually insulated electrically from the bolt. A nut 9 is threaded on the lower end of bolt 2, a suitable washer 10 of insulating material being interposed between this nut and the arm 8. The axis of bar 8, which bar is made of resilient brass, or other suitable electric conducting material, is disposed in a plane at right angles to the axis of the switch arm 3.

Three head contact screws 11, 12 and 13 are inserted through disk 1. These screws are all disposed concentric with the pivot bolt 2, and are equi-distant therefrom. The screws 11 and 13 are disposed diametrically opposite each other on the disk and the screw 12 is positioned mid-way between screws 11 and 13, so that the heads of these three screws are contained within an arc of 180° and are spaced 90° apart. Thumb nuts 14, 15 and 16, are threaded on the screws 11, 15 and 12, respectively, underneath the disk 1. A metal washer 17 is interposed between each thumb nut and the disk. These thumb nuts and washers provide means whereby a wire may be electrically connected to each of the contact screws. The switch handle 3 is provided on its under face with an integral rounded boss or contact member 18. This member is so disposed that, when the switch handle is rotated, it will contact with the heads of the contact screws. By turning switch handle 3 in the proper direction, the two contact screws 11 and 13 may be electrically connected by means of the arm 8, or the switch arm 3 may be electrically connected to either of the screws 11 and 13, as desired.

Referring more particularly to Figs. 6 and 7 of the drawings, the positive side of an electric battery 19 is connected by a lead 20 to the switch handle 3, this lead being secured between the head 2$^b$ of the pivot bolt 2 and the inner end of the switch handle. The negative side of battery 19 is connected by wire 21 to the head light 22 of the automobile, which is connected by wire 23 to the other head light 24. Head light 24 is connected by a wire 25 to the contact screw 11. Contact screw 12 is connected by a lead 26 to wire 23 intermediate the head lights, and contact screw 13 is connected by a lead 27 to the wire 21 intermediate battery 19 and head light 22. By turning the switch handle 3 into the position shown in Fig. 6 of the drawings, the two contact screws 11 and 13 will be electrically connected through the contact bar 8, and the positive side of battery 19 will be connected to lead 26 through switch handle 3 and contact screw 12. With the switch in this position, a current will flow from the positive side of the battery through lead 26 to wire 23. This current will divide at the point of junction between lead 26 and wire 23, part of the current flowing through head light 22 and wire 21 to the negative side of the battery. The other part of the current will flow through head light 24, wire 25, contact screw 11, contact arm 8, and contact 13, lead 27, and a portion of wire 21 to the negative side of the battery. By this means the lights are connected in multiple to the battery so that the current passes through each light at full power thus insuring a maximum of illuminating power from the lights. By turning the switch into the position shown in Fig. 7 of the drawings, the current will flow from the positive side of the battery through lead 20, switch handle 3 and contact screw 11, wire 25, head light 24, wire 23, head light 22, and wire 21 to the negative side of the battery. By this means the head lights are connected in series with the battery, thus opposing twice the resistance to the passage of the current which results in materially reducing the flow of current through the lights thus dimming the lights. By means of the specially constructed switch which I provide, the lights may be quickly and easily connected to the battery either in multiple or in series, as desired, thus rendering it possible to either dim the lights, or turn them on with full force, by means of a single control switch of simple construction and operation.

There may be slight changes made in the construction and arrangement of the different parts of my invention without departing from the field and scope of the same, and I intend to include all such changes, as fall within the appended claim, in this application in which a preferred form only of my invention is disclosed.

What I claim is:—

In switches, the combination of a disk of insulating material, a pivot bolt rotatably mounted through the center of said disk, three headed contact screws secured through said disk concentric with the bolt, a switch handle secured on the bolt above the disk having a downwardly extending member adapted to engage the heads of the contact screws when the handle is rotated, said contact screws being spaced approximately 90° apart, and a connecting bar carried by the pivot bolt and connected to said bolt so as to rotate therewith, said bar being electrically insulated from the bolt and of such length as to electrically connect the two diametrically opposite contact screws when the switch handle is moved into a predetermined position, the axis of said connecting bar being disposed at right angles to the axis of said switch handle.

In testimony whereof I affix my signature in presence of two witnesses.

BARNEY L. BUSCH.

Witnesses:
Joseph J. Thiel,
M. Ammann.